(12) United States Patent
Lim et al.

(10) Patent No.: US 8,576,221 B2
(45) Date of Patent: Nov. 5, 2013

(54) APPARATUS AND METHOD FOR GENERATING MESH MODELS OF FEATHERS

(75) Inventors: Choong-Gyoo Lim, Daejeon (KR); Byoung-Tae Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 546 days.

(21) Appl. No.: 12/959,865

(22) Filed: Dec. 3, 2010

(65) Prior Publication Data

US 2011/0148862 A1 Jun. 23, 2011

(30) Foreign Application Priority Data

Dec. 18, 2009 (KR) .......... 10-2009-0126719
Apr. 12, 2010 (KR) .......... 10-2010-0033390

(51) Int. Cl.
*G06T 15/00* (2011.01)
*G06T 11/20* (2006.01)
*G06T 13/00* (2011.01)

(52) U.S. Cl.
USPC ............ 345/419; 345/441; 345/473; 345/442

(58) Field of Classification Search
None
See application file for complete search history.

(56) References Cited

U.S. PATENT DOCUMENTS

| | | | |
|---|---|---|---|
| 6,968,299 B1 | 11/2005 | Bernardini et al. | |
| 2003/0179203 A1* | 9/2003 | Bruderlin et al. | 345/473 |
| 2005/0012741 A1* | 1/2005 | Chen et al. | 345/419 |
| 2005/0012746 A1* | 1/2005 | Chen et al. | 345/441 |

OTHER PUBLICATIONS

Streit, Lisa, and Wolfgang Heidrich. "A Biologically—Parameterized Feather Model." Computer Graphics Forum. vol. 21. No. 3. Blackwell Publishing, Inc, 2002.*
Weber, Andrew J., and Galen Gornowicz. "Collision-free construction of animated feathers using implicit constraint surfaces." ACM Transactions on Graphics (TOG) 28.2 (2009): 12.*
Franco, Cristiano G., and Marcelo Walter. "Modeling and rendering of individual feathers." Computer Graphics and Image Processing, 2002. Proceedings. XV Brazilian Symposium on. IEEE, 2002.*
Chen, Yanyun, et al. "Modeling and rendering of realistic feathers." ACM Transactions on Graphics (TOG). vol. 21. No. 3. ACM, 2002.*
Franco, Cristiano G., and Marcelo Walter. "Modeling the Structure of Feathers." SIBGRAPI. 2001.*

(Continued)

*Primary Examiner* — Kee M Tung
*Assistant Examiner* — Zhengxi Liu
(74) *Attorney, Agent, or Firm* — Staas & Halsey LLP

(57) ABSTRACT

Provided are an apparatus and a method for generating mesh models of feathers. The apparatus for generating the mesh models of the feathers includes a geometrical model analyzing unit that analyzes groups of barbs included in a geometrical curve model of the feather; a calculating unit that calculates the number of grids for each of the groups of barbs by applying curve lengths of the barbs and an average length of the curve lengths included in each of the groups of barbs; and a mesh model generating unit that constructs the geometrical curve models as polygonal mesh models based on the number of grids. According to the present invention, it extracts curved points by using characteristics of a model of a feather and constructs polygonal meshes by using the extracted curved points, thereby making it possible to physically and realistically express the forced physical variation of the polygonal meshes.

19 Claims, 5 Drawing Sheets

(56) References Cited

OTHER PUBLICATIONS

Wei, Xiaoming, Feng Qiu, and Arie Kaufman. "Simulation of Free Feather Behavior." Advances and Innovations in Systems, Computing Sciences and Software Engineering. Springer Netherlands, 2007. 497-502.*

Sunil Arya et al., "Space-Efficient Approximate Voronoi Diagrams," Proc. $34^{th}$ ACM Symp. On Theory of Computing, STOC'02, May 2002, Canada.

* cited by examiner

APPARATUS AND METHOD FOR GENERATING MESH MODELS OF FEATHERS

CROSS REFERENCE TO RELATED APPLICATIONS

This application claims priority to Korean Patent Application No. 10-2009-0126719 filed on Dec. 18, 2009 and Korean Patent Application No. 10-2010-0033390 filed on Apr. 12, 2010, the entire contents of which are herein incorporated by reference.

BACKGROUND OF THE INVENTION

1. Field of the Invention

The present invention relates to an apparatus and a method for generating mesh models of feathers, and in particular, to an apparatus and a method for generating mesh models of feathers capable of constructing a polygonal mesh model by using curved data of a geometrical curve model in order to express interaction between CG (Computer Graphics) models and physical forces such as wind, gravity, etc.

2. Description of the Related Art

Increasing demand for high-quality images is due to the expanded distribution of visual contents in the fields of CG and VR (Virtual Reality). In order to create high-quality images, objects having a complex shape are modeled similar to real objects by using the CG technology. Generally, the objects are modeled by using polygons (polygonal meshes); however, in order to more accurately perform the modeling, a free curve and a free curved surface which have an excellent power of expression has been used.

When a 3D scanner is used to model the complicated object, curved surface points in a grid form are provided or curved surface points in a line form are provided. In order to reconstruct the provided objects by a computer, the polygonal meshes should be constructed by using these points.

The reason for using the polygonal meshes is that current graphic hardwares are designed to express the polygonal meshes and can approximately express the characteristics of the curved surface included in static models, for example, curvature, change in curvature, and so on. The free curve or the free curved surface may be suitable to more accurately express the characteristics of the curved surface; however, it is difficult to express physical variations.

Technologies constructing the polygonal meshes by using the curved data acquired by using the 3D scanner, etc., have been developed.

The related art provides a method that converts the curved surface points in the curved line form or the curved surface points in the grid form into the polygonal mesh model; however, the method does not consider the physical variations changed by the external physical forces.

SUMMARY OF THE INVENTION

An aspect of the present invention provides an apparatus and a method for generating mesh models of feathers that converts a geometrical curve model of a feather into a polygonal curved surface.

Another aspect of the present invention provides an apparatus and a method for generating mesh models of feathers capable of constructing a polygonal mesh model in consideration of physical variations.

Still another aspect of the present invention provides an apparatus and a method for generating mesh models of feathers capable of calculating and expressing physical motions of a feather by a computer.

Yet another aspect of the present invention provides an apparatus and a method for generating mesh models of feathers capable of calculating the number of grids and a grid ratio for groups of barbs of a feather by a simple equation.

According to an exemplary embodiment of the present invention, there is provided an apparatus for generating mesh models of feathers, including: a geometrical model analyzing unit that analyzes groups of barbs included in a geometrical curve model of the feather; a calculating unit that calculates the number of grids for each of the groups of barbs by applying curve lengths of the barbs and an average curve length for the curve lengths included in each of the groups of barbs; and a mesh model generating unit that constructs a polygonal mesh model from the geometrical curve model based on the number of grids.

The calculating unit calculates the number of grids for the groups of barbs by applying the maximum values and the minimum values for the average curve length of each of the groups of barbs.

The calculating unit receives the number of grids corresponding to each of the maximum values and the minimum values from a user to calculate the number of grids for each of the groups of barbs.

The mesh model generating unit performs tessellation of curved surface of the groups of barbs to extract curved surface points from curved line points of the barbs and constructs the polygonal mesh model by using the curved surface points.

The mesh model generating unit determines whether barb widths of the groups of barbs are to be applied to construct the polygonal mesh model.

The geometrical model analyzing unit detects the barb widths for each of the groups of barbs when the barb widths are to be applied to the polygonal mesh model.

The geometrical model analyzing unit detects the maximum value and the minimum value of the barb widths.

The calculating unit calculates a grid ratio for each of the groups of barbs by using the barb widths.

The mesh model generating unit constructs the polygonal mesh models by applying the grid ratio to the number of grids.

According to another exemplary embodiment of the present invention, there is provided a method for generating mesh models of feathers, including the steps of: a step of calculating curve lengths of barbs belonging to each of the groups of barbs of geometrical curve model of the feather and calculating a average curve length for the curve lengths of the barbs; a steps of reflecting the average curve length of each of the groups of barbs to calculate number of grids for each of the groups of barbs; and a step of applying the number of grids for each of the groups of barbs to construct a polygonal mesh model from the geometrical curve model.

The step of calculating the average curve length includes detecting the maximum value and the minimum value for the average curve length of each of the groups of barbs.

The method for generating the mesh models of the feathers further includes prior to the step of calculating the number of grids, a step receiving the number of grids corresponding to the maximum value and the minimum value from a user.

The step of calculating the number of grids uses the number of grids corresponding to the maximum value and the minimum value in order to calculate the number of grids for each of the groups of barbs.

The method for generating the mesh models of the feathers further includes prior to the step of constructing the polygonal mesh model, a step of performing tessellation for curved surface of the groups of barbs to extract the curved surface points from the curved line points of the barbs.

The method for generating the mesh models of the feathers further includes a step of determining whether the barb widths of the groups of barbs are to be applied to construct the polygonal mesh model.

The method for generating the mesh models of the feathers further includes a step of calculating the barb widths for each of the groups of barbs when the barb widths are to be applied to the polygonal mesh model.

The method for generating the mesh models of the feathers further includes a step of detecting the maximum value and the minimum value of the barb widths.

The method for generating the mesh models of the feathers further includes a step of calculating a grid ratio for each of the groups of barbs by using the barb widths.

The step of constructing the polygonal mesh model applies the grid ratio to the number of grids to construct the polygonal mesh model.

The apparatus and method for generating the mesh models of the feathers according to the exemplary embodiments of the present invention can have the following effects.

First, the present invention extracts the curved surface points by using the characteristics of the feather model formed of the curved lines and forms the polygonal meshes by using the extracted curved surface points, thereby making it possible to easily construct the meshes.

Second, the present invention can physically and realistically express the variation of the feather model by converting the surfaces having the feather model into the polygons so that it calculates the reaction to the physical force applied to the feather.

DETAILED DESCRIPTION OF THE PREFERRED EMBODIMENTS

Hereinafter, exemplary embodiments of the present invention will be described with reference to the accompanying drawings.

Figure 1:
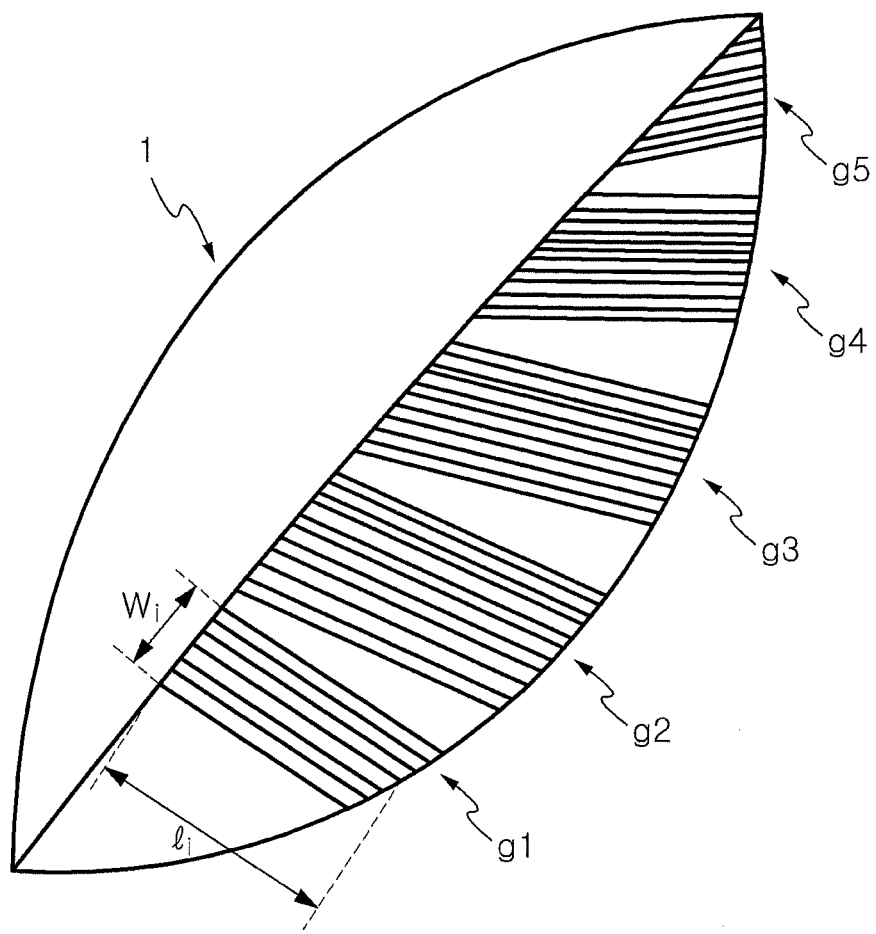
FIG. 1 is a diagram showing a geometrical curve model of a feather to which the present invention is applied.

FIG. 1 is a diagram showing a geometrical curve model of a feather to which the present invention is applied.

As shown in FIG. 1, a geometrical curve model of a feather has a form where plurality of barbs are attached to a shaft.

In this case, the barbs are configured of a plurality of groups of barbs g1, g2, g3, g4, and g5 as shown in FIG. 1. The barbs included in each group of barbs faces a predetermined direction and each of the groups of barbs face different directions. In other words, since the barbs move in a unit of the groups of barbs, when the motion of barbs is represented by a computer, it is efficient to use the polygonal mesh models similar to the shape of the aggregation of the curved lines rather than representing the curve model of barbs.

Therefore, when the apparatus for generating the mesh models of the feathers according to an exemplary embodiment of the present invention generates the polygonal mesh models for the feather, the polygonal mesh models are generated in the unit of each group of barbs and the length information $l_i$, $l_M$, and $l_m$ of the barbs and are generated by applying the width $W_i$ of the groups of barbs belonging to the groups of barbs.

In this case, the apparatus for generating the mesh models of the feathers generates the mesh models in consideration of the forced physical variation of the meshes, such that the motion of the feather can be realistically represented by a simple calculation.

Figure 2:
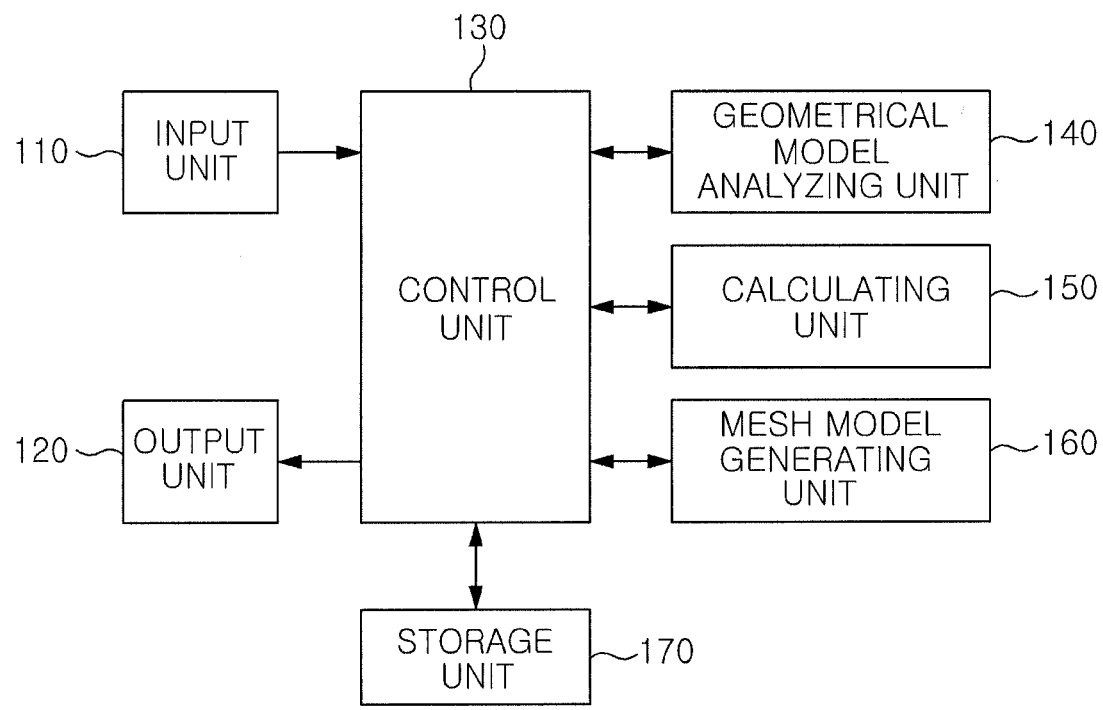
FIG. 2 is a block diagram referenced for explaining a configuration of an apparatus for generating mesh models of feathers according to an exemplary embodiment of the present invention.

FIG. 2 is a block diagram referenced for explaining a configuration of an apparatus for generating the mesh models of the feathers according to an exemplary embodiment of the present invention.

As shown in FIG. 2, the apparatus for generating the mesh models of the feathers according to an exemplary embodiment of the present invention includes an input unit 110, an output unit 120, a control unit 130, a geometrical model analyzing unit 140, a calculating unit 150, a mesh model generating unit 160, and a storage unit 170.

The input unit 110 serves to transfer control command input through a keyboard, a mouse, etc., from the user or data input from the outside through an interface, etc., to the control unit 130. The output unit 120 serves to output the operational state or result data on a screen, such as a monitor, etc.

The geometrical model analyzing unit 140 analyzes the groups of barbs included in the geometrical curve model of the feather. In this case, the geometrical model analyzing unit 140 detects the curve lengths of the barbs belonging to each group of barbs.

In addition, the geometrical model analyzing unit 140 calculates the average length of the curved lines for the curve lengths of barbs. In this case, the geometrical model analyzing unit 140 detects the maximum value $l_M$ and the minimum value $l_m$ of the average curve length of each of the groups of barbs.

In addition, the geometrical model analyzing unit 140 detects the barb widths for each group of barbs. In this case, the geometrical model analyzing unit 140 detects the maximum value $W_M$ and the minimum value $W_m$ for the widths of barbs of the groups of barbs.

Meanwhile, the calculating unit 150 calculates the number of grids for each group of barbs by applying a part of the curve length of the barbs belonging to each of the groups of barbs.

In this case, Equation of calculating the number of grides depends on the following Equation 1.

$$h = h_m + \frac{(l_i - l_m) \times (h_M - h_m)}{(l_M - l_m)} \qquad \text{[Equation 1]}$$

where h represents the number of grids, $l_i$ represents the average length of the curved lines of the barbs belonging to the i-th group of barbs, $l_M$ is a maximum value for the average length of the curved lines of each group of barbs, $l_m$ represents the minimum value for the average length of the curved lines of each group of barbs, $h_M$ represents the number of grids corresponding to $l_M$, and $h_m$ represents the number of grids corresponding to $l_m$.

In this case, the calculating unit 150 calculates the average length for the curve lengths of the barbs detected from the geometrical model analyzing unit 140 for each group of barbs.

Meanwhile, $h_M$ and $h_m$ values are previously given by the user.

Therefore, the calculating unit 150 applies the average curve length $l_i$ of the barbs belonging to each of the groups of barbs, the maximum value $l_M$ and the minimum value $l_m$ for the average curve lengths for each of the groups of barbs, and the $h_M$ value and the $h_m$ value given from the user to Equation 1, thereby calculating the number of grids for the i-th group of barbs. In this case, the calculating unit 150 calculates the number of grids for each of the groups of barbs.

Meanwhile, when the calculating unit 150 applies the barb widths for the groups of barbs in calculating the number of grids, it further calculates the grid ratio by using the barb widths.

In this case, the Equation for calculating the grid ratio depends on the following Equation 2.

$$V = V_m + \frac{(W_i - W_m) \times (W_M - W_m)}{(V_M - V_m)} \quad \text{[Equation 2]}$$

where V represents the grid ratio, $W_i$ represents the barb width of the i-th group of barbs, $W_M$ represents the maximum value for the barb widths of the groups of barbs, $W_m$ represents the minimum value for the barb widths of the groups of barbs, $V_M$ represents the grid ratio corresponding to $W_M$, and $V_m$ represents the grid ratio corresponding to $W_m$. The $V_M$ value and the $V_m$ value are values previously given by the user.

Therefore, the calculating unit 150 applies the values detected from the geometrical model analyzing unit 140 to Equation 2, thereby calculating the grid ratio for the i-th group of barbs. In this case, the calculating unit 150 calculates the grid ratio for each of the groups of barbs.

In addition, the calculating unit 150 calculates the final number of grids from a value h*V obtained by multiplying the number of grids calculated by Equation 1 by the grid ratio calculated by Equation 2.

The mesh model generating unit 160 generates the polygonal mesh model from the geometrical curve model based on the number of grids. In this case, the mesh model generating unit 160 determines whether it applies the barb widths of the geometrical curve model, prior to generating the polygonal mesh model for the geometrical curve model of the feather.

If the mesh model generating unit 160 does not apply the barb widths of the geometrical curve model, it generates the polygonal mesh model for the geometrical curve model of the feather based on the number of grids calculated by the calculating unit 150.

On the other hand, if the mesh model generating unit 160 applies the barb widths of the geometrical curve model, it generates the polygonal mesh model for the geometrical curve model of the feather based on the number of grids and the grid ratio calculated by the calculating unit 150.

In this case, the mesh model generating unit 160 performs tessellation on the curved surface of the groups of barbs to extract the curved surface points from the curved line points of the barbs and constructs the polygonal mesh model by using the extracted curved surface points.

The control unit 130 controls each unit described above. In addition, when the polygonal mesh model of the feather is generated by the mesh model generating unit 160, the control unit 130 stores the polygonal mesh model of the feather in the storage unit 170 and outputs it through the output unit 120 according to the request.

Figure 3:
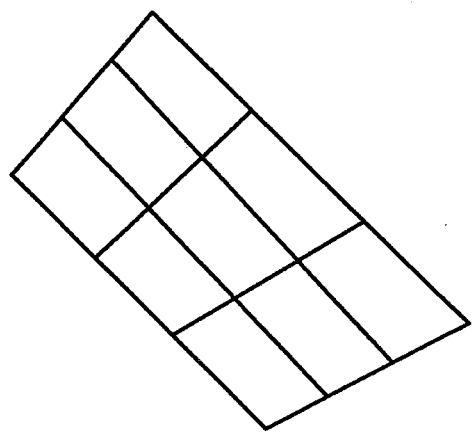
FIGS. 3 and 4 are diagrams referenced for explaining an operation of the apparatus for generating the mesh models of the feathers according to an exemplary embodiment of the present invention.
Figure 4:
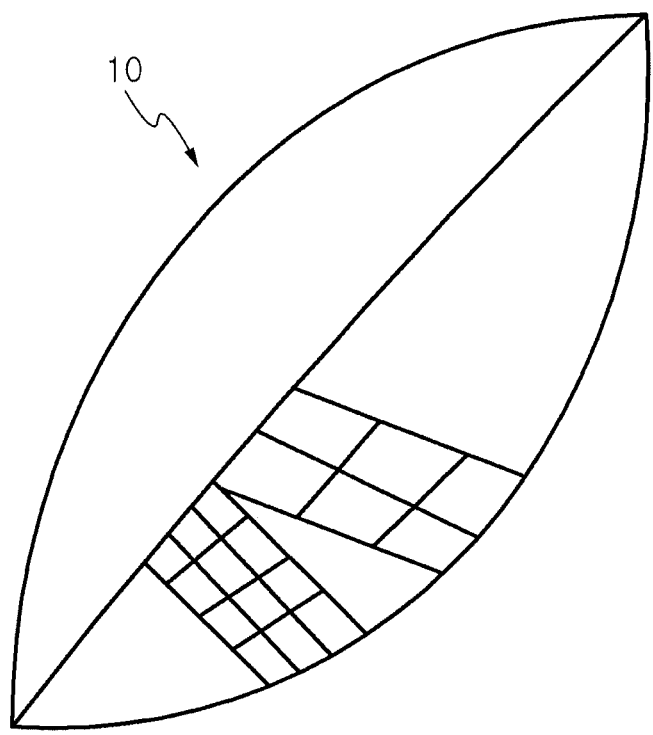

FIGS. 3 and 4 are diagrams referenced for explaining an operation of the apparatus for generating the mesh models of the feathers according to an exemplary embodiment of the present invention; and FIG. 3 shows the polygonal meshes according to a tessellation process in generating the mesh models of the feather according to an exemplary embodiment of the present invention.

In other words, the mesh model generating unit 160 performs tessellation based on the number of grids and the grid ratio calculated from the geometrical curve model of the feather, thereby generating the polygonal mesh as shown in FIG. 3.

The polygonal mesh shown in FIG. 3 represents example construction of a polygonal mesh, when the number of grids is 3 and the grid ratio is 3.

FIG. 4 shows an example where the polygonal mesh generated as shown in FIG. 3 is applied to the geometrical curve model of the feather.

As shown in FIG. 4, the polygonal mesh model of the feather is generated by disposing the polygonal mesh generated for each of the groups of barbs in the area where the corresponding groups of barbs are disposed.

The operations of the present invention configured as described above will now be described.

Figure 5:
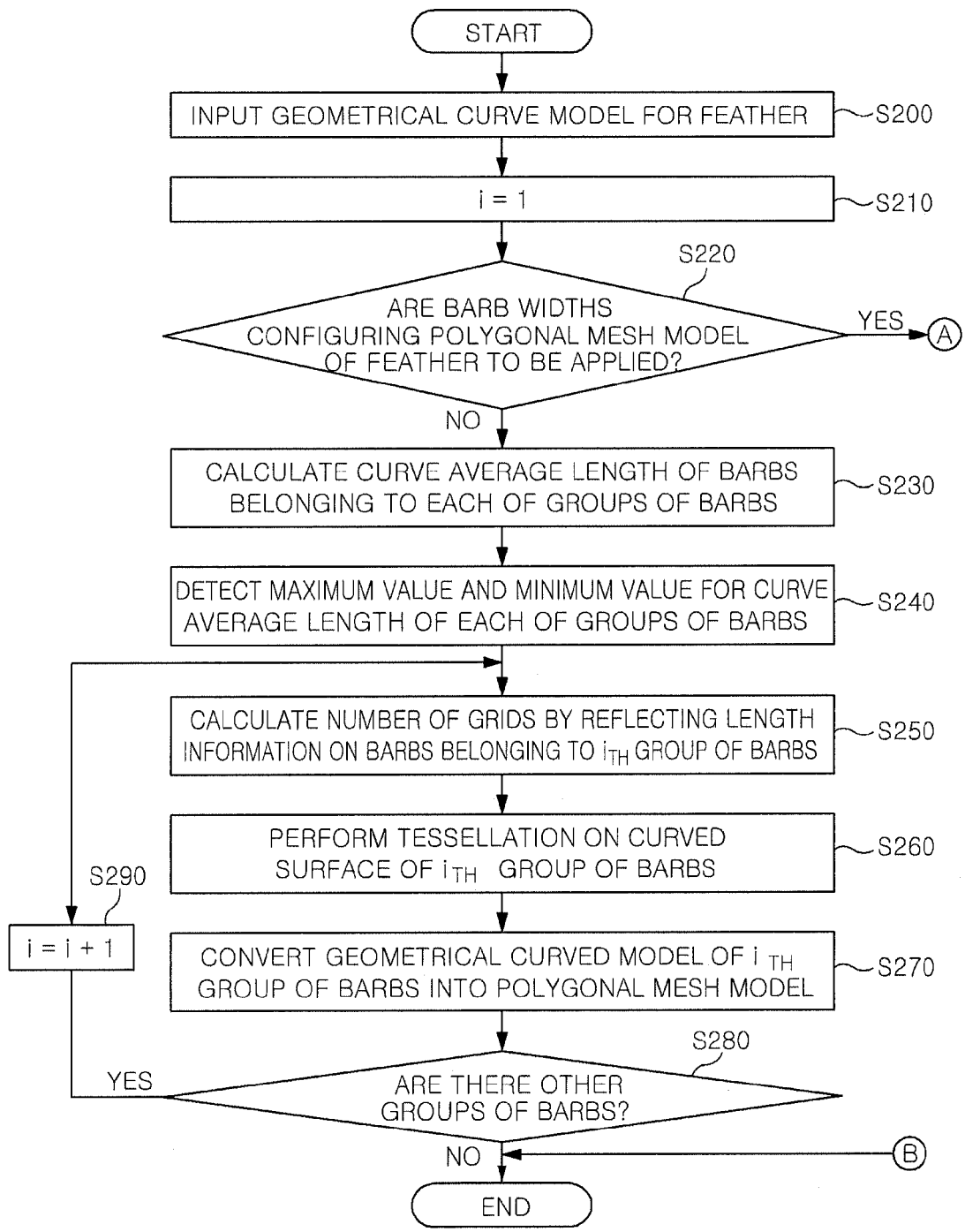
FIGS. 5 and 6 are flow charts referenced for explaining an operation of the apparatus for generating the mesh models of the feathers according to an exemplary embodiment of the present invention.
Figure 6:
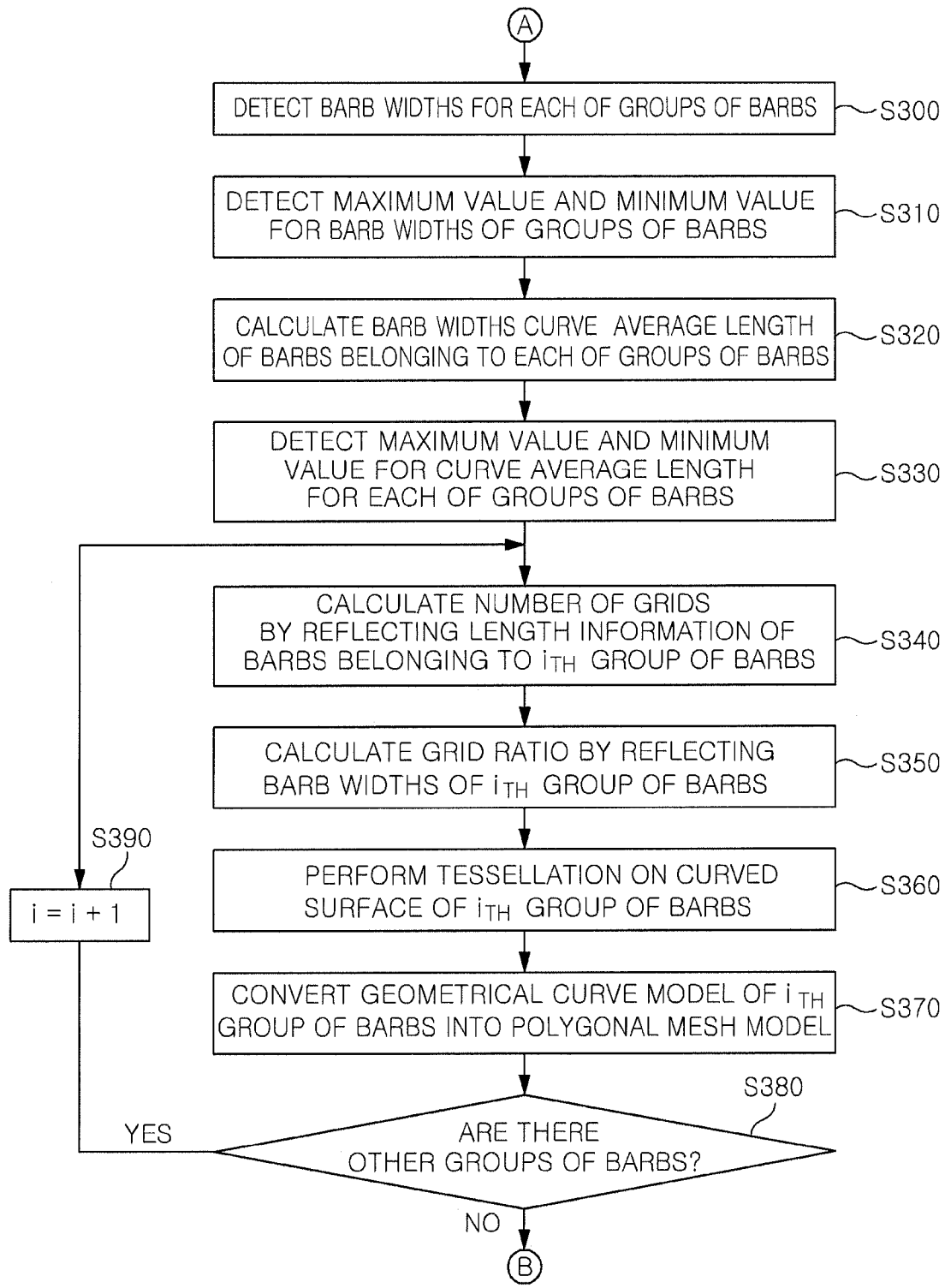

FIGS. 5 and 6 are flow charts referenced for explaining an operation of the apparatus for generating the mesh models of the feathers according to an exemplary embodiment of the present invention.

First, as shown in FIG. 5, when the geometrical curve model of the feather is input (S200), the geometrical model analyzing unit 140 analyzes the input geometrical curve model.

Thereafter, the mesh model generating unit 160 determines whether it applies the barb widths of each of the groups of barbs to construct the polygonal mesh model of the feather (S220).

When the barb widths are applied, the process after 'A' of FIG. 6 is performed.

Meanwhile, when the barb widths are not applied, the calculating unit 150 calculates the average curve length for the curve lengths of the barbs belonging to each of the groups of barbs (S230).

In addition, the calculating unit 150 detects the maximum value and the minimum value for the average curve length of each of the groups of barbs calculated during step 'S230' (S240).

In this case, the calculating unit 150 applies the average curve length of the i-th group of barbs calculated during step 'S230' and the maximum value and the minimum value during step 'S240' in calculating the number of grids for the i-th group gi for barbs (S250).

In this case, since i=1 during step 'S210', the number of grids for the group g1 of the first barbs among the groups of barbs during step 'S250' can be calculated.

The mesh model generating unit 160 applies the number of grids during step 'S250' in performing tessellation (S260). The mesh model generating unit 160 converts the curved line points of the first group g1 of the barbs into the curved surface points during step 'S260', thereby generating the polygonal mesh model.

In addition, the mesh model generating unit 160 applies the polygonal mesh generated during step 'S260' to the first group g1 of the barbs of the geometrical curve model, thereby generating the polygonal mesh model (S270).

Thereafter, when there exist other groups of barbs in the geometrical curve model, steps 'S250' to 'S290' are repeatedly performed until the polygonal mesh model for the final group of barbs is generated while i value is increased by 1.

If the polygonal mesh model for the final group of barbs is generated, the polygonal mesh model for all the groups of barbs is completed, and the process of generating the mesh models ends.

Meanwhile, when the barb widths are applied during step 'S220', as shown in FIG. 6, the calculating unit 150 detects the barb widths for each of the groups of barbs from the geometrical model analyzing unit 140 (S300). In addition, the calculating unit 150 detects the maximum value and the minimum value for the barb widths of the groups of barbs (S310).

Thereafter, the calculating unit 150 calculates the average curve length for the curve lengths of the barbs belonging to each of the groups of barbs (S320).

In addition, the calculating unit 150 detects the maximum value and the minimum value for the average curve length of each of the groups of barbs calculated during step 'S320' (S330).

In this case, the calculating unit 150 applies the average curve length of the i-th group of barbs calculated during step 'S320' and the maximum value and the minimum value during step 'S330', thereby calculating the number of grids for the i-th group gi for barbs (S340).

In this case, since i=1 during step 'S210' of FIG. 5, the number of grids for the first group g1 of the barbs among the groups of barbs during step 'S340' can be calculated.

In addition, the calculating unit 150 reflects the barb widths of the first group g1 of the barbs, thereby calculating the grid ratio (S350). Step 'S350' applies the barb widths of the first group g1 of the barbs detected during step 'S300' and the maximum value and the minimum value for the barb widths detected during step 'S310', thereby calculating the grid ratio V. In this case, the final number of grids is a value of h*V.

The mesh model generating unit 160 applies the number of grids calculated during step 'S340' and the grid ratio calculated during step 'S350' in performing tessellation (S360). The mesh model generating unit 160 converts the curved line points of the first group g1 of the barbs into the curved surface points during step 'S360', thereby generating the polygonal mesh.

In addition, the mesh model generating unit 160 applies the polygonal mesh generated during step 'S360' to the first group g1 of the barbs of the geometrical curve model, thereby generating the polygonal mesh model (S370).

Thereafter, when there exist other groups of barbs in the geometrical curve model (S380), steps 'S340' to 'S390' are repeatedly performed until the polygonal mesh model for the final group of barbs is generated while the i value is increased by 1 (S390).

If the polygonal mesh model for the final group of barbs is generated, the polygonal mesh model for all the groups of barbs is completed, and the process after 'B' of FIG. 5 proceeds and the process of generating the mesh model ends.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. An apparatus for generating mesh models of feathers, comprising:
    a processor and memory;
    a geometrical model analyzer that analyzes groups of barbs included in a geometrical curve model of the feather, wherein each group of barbs faces a predetermined direction that is different from those of its neighboring groups;
    a calculator that calculates a number of grids for each of the groups of barbs, wherein the number increases as an average curve length for the curve lengths included in each of the groups of barbs increases; and
    a mesh model generator that constructs a polygonal mesh model from the geometrical curve model based on the number of grids by performing tessellation on each curved surface representing a group of barbs to extract points on curved lines that represent barbs, so that motion of the group of barbs is efficiently represented by the group of barbs' corresponding polygonal mesh.

2. The apparatus for generating the mesh models of the feathers according to claim 1, wherein the calculator calculates the number of grids for the groups of barbs by applying the maximum values and the minimum values for the average curve length of each of the groups of barbs.

3. The apparatus for generating the mesh models of the feathers according to claim 2, wherein the calculator receives the number of grids corresponding to each of the maximum values and the minimum values from a user to calculate the number of grids for each of the groups of barbs.

4. The apparatus for generating the mesh models of the feathers according to claim 1, wherein the mesh model generator constructs the polygonal mesh model by using the extracted curved line points.

5. The apparatus for generating the mesh models of the feathers according to claim 1, wherein the mesh model generator determines whether barb widths of the groups of barbs are to be applied to construct the polygonal mesh model.

6. The apparatus for generating the mesh models of the feathers according to claim 5, wherein the geometrical model analyzer detects the barb widths for each of the groups of barbs when the barb widths are to be applied to the polygonal mesh model.

7. The apparatus for generating the mesh models of the feathers according to claim 6, wherein the geometrical model analyzer detects the maximum value and the minimum value of the barb widths.

8. The apparatus for generating the mesh models of the feathers according to claim 6, wherein the calculator calculates a grid ratio for each of the groups of barbs by using the barb widths.

9. The apparatus for generating the mesh models of the feathers according to claim 8, wherein the mesh model generator constructs the polygonal mesh models by applying the grid ratio to the number of grids.

10. A method for generating mesh models of feathers, comprising the steps of:
    a step of grouping barbs into groups of barbs so that barbs in a group faces a redetermined direction wherein the group's neighboring groups have barbs facing directions that are different from the predetermined direction;
    a step of calculating curve lengths of barbs belonging to each of the groups of barbs of geometrical curve model of the feather and calculating an average curve length for the curve lengths of the barbs;
    a step of reflecting the average curve length of each of the groups of barbs to calculate a number of grids for each of the groups of barbs, so that the number increases as the average curve length increases; and a step of applying the number of grids for each of the groups of barbs to construct a polygonal mesh model from the geometrical curve model by performing tessellation on each curved surface representing a group of barbs to extract points on curved lines that represent barbs, so that motion of the group of barbs is efficiently represented by the group of barbs' corresponding polygonal mesh.

11. The method for generating the mesh models of the feathers according to claim 10, wherein the step of calculating the average curve length includes detecting the maximum value and the minimum value for the average curve length of each of the groups of barbs.

12. The method for generating the mesh models of the feathers according to claim 11, further comprising prior to the step of calculating the number of grids, a step of receiving the number of grids corresponding to the maximum value and the minimum value from user.

13. The method for generating the mesh models of the feathers according to claim 12, wherein the step of calculating the number of grids uses the number of grids corresponding to the maximum value and the minimum value to calculate the number of grids for each of the groups of barbs.

14. The method for generating the mesh models of the feathers according to claim 10, further comprising, prior to the step of constructing the polygonal mesh model, a step of performing tessellation for curved surface of the groups of barbs to extract the curved surface points from the curved line points of the barbs.

15. The method for generating the mesh models of the feathers according to claim 10, further comprising a step of determining whether barb widths of the groups of barbs are to be applied to construct the polygonal mesh model.

16. The method for generating the mesh models of the feathers according to claim 15, further comprising a step of calculating the barb widths for each of the groups of barbs when the barb widths are to be applied to the polygonal mesh model.

17. The method for generating the mesh models of the feathers according to claim 16, further comprising a step of detecting the maximum value and the minimum value of the barb widths.

18. The method for generating the mesh models of the feathers according to claim 16, further comprising a step of calculating a grid ratio for each of the groups of barbs by using the barb widths.

19. The method for generating the mesh models of the feathers according to claim 18, wherein the step of constructing the polygonal mesh model applies the grid ratio to the number of grids to construct the polygonal mesh model.

* * * * *